United States Patent Office 3,706,796
Patented Dec. 19, 1972

3,706,796
SUBSTITUTED AMIDES
Edward S. Blake, Dayton, Ohio, assignor to
Monsanto Company, St. Louis, Mo.
No Drawing. Filed Nov. 25, 1970, Ser. No. 92,898
Int. Cl. C07c *103/30*
U.S. Cl. 260—558 D          10 Claims

ABSTRACT OF THE DISCLOSURE

Substituted amides as new chemical compounds. These compounds have been found to be useful in the control of bacteria.

---

This invention relates to a novel class of organic chemical compounds. More particularly, this invention is concerned with novel substituted amides which have been found to possess useful and unexpected biological activity.

The novel compounds of this invention have the formula

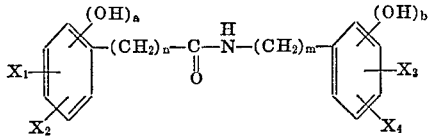

wherein $n$ and $m$ independently are 0 to 1 provided that the sum of $n+m$ is at least 1;

$a$ and $b$ independently are 0 or 1 provided that the sum of $a+b$ is at least 1; and $X_1$, $X_2$, $X_3$ and $X_4$ are independently selected from the halogens chlorine and bromine.

The substituted amine compounds of this invention wherein $m$ is 1 and $n$ is 0 can be readily prepared by reacting an appropriate dihalogenated benzyl amine with an appropriate dihalogenated benzoyl chloride. Such a reaction is illustrated by the following equation:

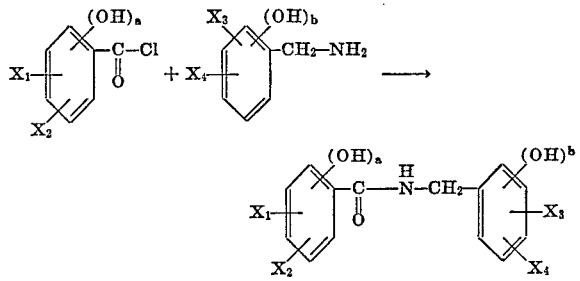

The substituted amide compounds of this invention wherein $m$ is 0 and $n$ is 1 can be readily prepared by reacting an appropriate dihalogenated aniline with an appropriate dihalogenated phenylacetate. Such a reaction is illustrated by the following equation (the illustrative phenyl acetate is a phenyl phenyl acetate):

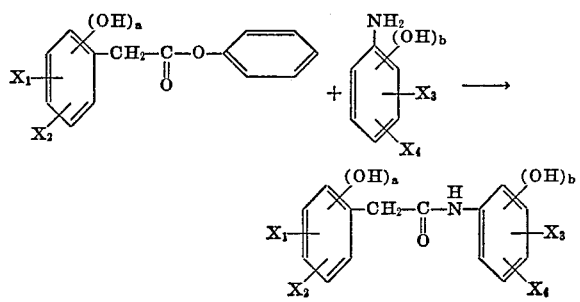

The substituted amide compounds of this invention wherein both $m$ and $n$ are 1 can be readily prepared by reacting an appropriate dihalogenated benzylamine with an appropriate dihalogenated phenylaceate. Such a reaction is illustrated by the following equation (the illustrative phenyl acetate is a phenyl phenyl acetate):

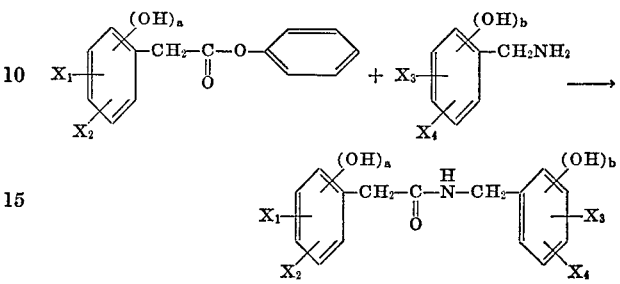

In the above illustrative preparation reactions $a$, $b$, $X_1$, $X_2$, $X_3$ and $X_4$ have the same meanings as defined hereinabove.

In practicing the preparations of this invention, it is preferred to carry out the reaction in the presence of an inert organic solvent. Suitable solvents include benzene, toluene, xylene, the chlorinated benzenes, ethyl ether, propyl ether, tetrahydrofuran, and the like.

The reaction temperatures employed in the preparation of the compounds of this invention will vary from room temperature to the reflux temperature of the reaction mixture. The specific temperature employed in any given preparation will be primarily dependent upon the particular reactants used therein. It should be noted that, although the presence of an inert organic solvent is preferred, it is not essential to the preparation of the compounds described herein.

The invention will be more fully understood by reference to the following examples which are set forth herein for the purpose of illustration only and which are not to be construed as limiting the scope of this invention in any manner.

EXAMPLE 1

N-(3,5-dichloro-2-hydroxybenzyl)-3,4-dichlorobenzamide

To a solution of 3,5 - dichloro-2-hydroxybenzylamine (4.2 g., 0.025 mole) in toluene (500 ml.) was added dropwise a solution of 3,4-dichlorobenzoyl chloride (2.09 g. 0.01 mole) in toluene (100 ml.). The reaction was heated at 60° C. for 2 hours and the solids separated by filtration. The solids were washed with very dilute hydrochloric acid and with water giving a crude yield of 2.2 g. Recrystallization out of toluene, after decolorization, gave a white product that had a melting point of 177.5–178.5° C. (corr.)

*Analysis.*—Calcd. for $C_{14}H_9Cl_4NO_2$ (percent): C, 46.06; H, 2.49. Found (percent): C, 45.87; H, 2.49.

EXAMPLE 2

N-(3,4-dichlorobenzyl)-3,5-dichloro-2-hydroxyphenylacetamide 3,4-dichlorobenzylamine (2 g., 0.0114 mole) was added to phenyl 3,5-dichloro-2-hydroxyphenylacetate (3 g., 0.01 mole) and the mixture became quite warm. The mixture was diluted with 1,2,4-trichlorobenzene (20 ml.) and heated to 175–190° C. for 2 hours. The white product (4.5 g.) was precipitated by the addition of petroleum ether and recrystallized out of toluene, gave a product that had a melting point of 144–145° C. (corr.)

*Analysis.*—Calcd. for $C_{15}H_{11}Cl_4NO_2$ (percent): C, 47.53; H, 2.92. Found (percent): C, 47.35; H, 2.80.

EXAMPLE 3

N-(3,5-dichloro-2-hydroxybenzyl)-3,5-dichloro-2-hydroxyphenylacetamide

A mixture of phenyl 3,5 - dichloro-2-hydroxyphenyl-acetate (3 g., 0.01 mole), and 3,5-dichloro-2-hydroxybenzylamine (2.5 g., 0.013 mole) was heated in 1,2,4-trichlorobenzene for 3 hours at 170–180° C. The cooled reaction was poured into petroleum ether to precipitate the product 5.5 g. The white product was washed with dilute hydrogen chloride solution and water to neutrality. Recrystallization out of toluene yielded a product that had a melting point of 182–183° C. (corr.)

*Analysis.*—Calcd. for $C_{15}H_{11}Cl_4NO_3$ (percent): C, 45.60; H, 2.81. Found (percent): C, 45.70; H, 2.74.

EXAMPLE 4

N-(3,4-dichlorophenyl)-3,5-dichloro-2-hydroxyphenylacetamide

A mixture of phenyl 3,5-dichloro-2-hydroxyphenylacetate (3.0 g., 0.01 mole) and 3,4-dichloroaniline (2.0 g., 0.0123 mole) in 1,2,4-trichlorobenzene (25 ml.) was heated with stirring for 4.5 hours at 174–180° C. The cooled reaction was diluted with petroleum ether to precipitate 4.3 g. of product. The product recrystallized out of diluted methanol after decolorizing with charcoal and had a melting point of 193–194° C. (corr.)

*Analysis.*—Calcd. for $C_{14}H_9Cl_4NO_2$ (percent): C, 46.06; H, 2.49. Found (percent): C, 45.92; H, 2.42.

In representative standard dilution tests the substituted amide compounds were found to be effective against *Staphylococcus aureus* at the dilution shown in Table I (which shows the highest dilution at which no growth of *Staphylococcus aureus* is observed).

TABLE I

| Compound of example: | Highest dilution (1:$X$) $X$ |
|---|---|
| 1 | 3,200,000 |
| 2 | 800,000 |
| 3 | 1,600,000 |
| 4 | 6,400,000 |

Similar activity is displayed by the other and different substituted amides of this invention.

Relatively small amounts of these substituted amides in a detergent soap composition have been found to yield effective antiseptic detergent soap compositions. Amounts as low as 0.1 to 1% by weight based upon the weight of the detergent soap have proved satisfactory in some instances. However, it is preferred to employ these substituted amides in amounts in the order of 1 to 3% by weight based on the detergent soap. While larger amounts may be employed, as for example, up to 10% by weight, the upper limit will be determined by practical considerations. Various colors, antioxidants, perfumes, water softeners, emollients and the like may be included where desirable in detergent soap composition containing the new substituted amides. The term "soap" or "detergent soap" as used herein is employed in its popular or ordinary sense, i.e., those cleansing compositions prepared from an alkali metal compound such as potassium or sodium hydroxide and a fat or fatty acid, both saturated and unsaturated.

While the invention has been described here with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula

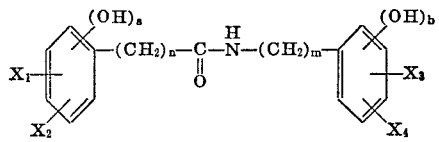

wherein $n$ and $m$ independently are 0 or 1 provided that the sum of $n+m$ is at least 1;

$a$ and $b$ independently are 0 or 1 provided that the sum of $a+b$ is at least 1 and provided that when $n$ is 0, $a$ is 0; and $X_1$, $X_2$, $X_3$ and $X_4$ are independently selected from the halogens chlorine and bromine.

2. A compound as defined in claim 1 wherein $n$ is 0.
3. A compound as defined in claim 1 wherein $m$ is 0.
4. A compound as defined in claim 1 wherein the sum of $m$ and $n$ is 2.
5. A compound as defined in claim 1 wherein $a$ is 0 and $b$ is 1.
6. A compound as defined in claim 1 wherein $b$ is 0 and $a$ is 1.
7. A compound as defined in claim 1 which is N-(3,5-dichloro-2-hydroxybenzyl)-3,4-dichlorobenzamide.
8. A compound as defined in claim 1 which is N-(3,4-dichlorobenzyl)-3,5-dichloro-2-hydroxyphenylacetamide.
9. A compound as defined in claim 1 which is N-(3,5-dichloro-2-hydroxybenzyl)-3,5-dichloro-2-hydroxyphenylacetamide.
10. A compound as defined in claim 1 which is N-(3,4-dichlorophenyl)-3,5-dichloro-2-hydroxyphenylacetamide.

References Cited
UNITED STATES PATENTS 3,455,940    7/1969    Stecker _____ 260—559

HARRY I. MOATZ, Primary Examiner

U.S. Cl. X.R.

260—473 R, 474, 476 R, 558 P, 559 R, 559 S; 252—106; 424—324

PO-1050
(5/69)

UNITED STATES PATENT OFFICE
CERTIFICATE OF CORRECTION

Patent No. 3,706,796      Dated December 19, 1972

Inventor(s) Edward S. Blake

It is certified that error appears in the above-identified patent and that said Letters Patent are hereby corrected as shown below:

In column 1, line 36, the word "amine" should be corrected to --amide--.

In column 2, line 4, the word "phenylaceate" should be corrected to read --phenylacetate--.

Signed and sealed this 12th day of June 1973.

(SEAL)
Attest:

EDWARD M. FLETCHER, JR.
Attesting Officer

ROBERT GOTTSCHALK
Commissioner of Patents